United States Patent
Xu et al.

(10) Patent No.: US 9,613,046 B1
(45) Date of Patent: *Apr. 4, 2017

(54) PARALLEL OPTIMIZED REMOTE SYNCHRONIZATION OF ACTIVE BLOCK STORAGE

(71) Applicant: NETAPP, INC., Sunnyvale, CA (US)

(72) Inventors: Michael Xu, Boulder, CO (US); James M. Wilson, Louisville, CO (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,543

(22) Filed: Dec. 14, 2015

(51) Int. Cl.
G06F 17/30 (2006.01)
G06F 11/14 (2006.01)
H04L 29/08 (2006.01)

(52) U.S. Cl.
CPC .... *G06F 17/30174* (2013.01); *G06F 11/1464* (2013.01); *H04L 67/1095* (2013.01); *H04L 67/1097* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,604,155 B1 | 8/2003 | Chong, Jr. | |
| 7,093,086 B1 * | 8/2006 | van Rietschote | G06F 11/1438 711/161 |
| 8,224,935 B1 * | 7/2012 | Bandopadhyay | G06F 9/5072 370/256 |
| 8,943,032 B1 * | 1/2015 | Xu | G06F 17/30079 707/661 |
| 9,298,417 B1 * | 3/2016 | Muddu | G06Q 10/00 |
| 2003/0028642 A1 | 2/2003 | Agarwal et al. | |
| 2004/0107281 A1 | 6/2004 | Bose et al. | |
| 2004/0133622 A1 | 7/2004 | Clubb et al. | |
| 2005/0091261 A1 * | 4/2005 | Wu | G06F 21/64 |
| 2007/0083722 A1 * | 4/2007 | Per | G06F 11/1451 711/162 |
| 2007/0208918 A1 * | 9/2007 | Harbin | G06F 11/1451 711/162 |
| 2009/0271412 A1 * | 10/2009 | Lacapra | G06F 17/30206 |
| 2010/0293147 A1 * | 11/2010 | Snow | G06F 17/30067 707/640 |
| 2011/0238857 A1 | 9/2011 | Certain et al. | |

(Continued)

*Primary Examiner* — Farhan Syed
(74) *Attorney, Agent, or Firm* — Gilliam IP PLLC (57) ABSTRACT

Updating a second cluster server that backs up a first cluster server includes retrieving a first metadata file from a first cluster server. The first metadata file includes a first ordered list of block identifiers for data blocks stored on a first plurality of block servers. The updating also includes retrieving a second metadata file from a second cluster server. The second metadata file includes a second ordered list of block identifiers for data blocks stored on a second plurality of block servers. The updating also includes comparing the first metadata file to the second metadata file to determine a difference list. The difference list includes block identifiers from the first ordered list that differ from block identifiers of the second ordered list. The updating also includes sending, to the first cluster server, a request for data blocks associated with the block identifiers from the difference list.

22 Claims, 5 Drawing Sheets

(56) References Cited

U.S. PATENT DOCUMENTS

| | | | |
|---|---|---|---|
| 2012/0197844 A1* | 8/2012 | Wang | G06F 11/1464 |
| | | | 707/646 |
| 2013/0138616 A1* | 5/2013 | Gupta | G06F 17/30174 |
| | | | 707/690 |
| 2015/0112939 A1* | 4/2015 | Cantwell | G06F 11/1451 |
| | | | 707/646 |
| 2015/0220402 A1* | 8/2015 | Cantwell | G06F 11/1451 |
| | | | 707/646 |
| 2015/0242478 A1* | 8/2015 | Cantwell | H04L 67/1095 |
| | | | 707/634 |
| 2015/0244795 A1* | 8/2015 | Cantwell | H04L 67/1095 |
| | | | 709/202 |

\* cited by examiner

PARALLEL OPTIMIZED REMOTE SYNCHRONIZATION OF ACTIVE BLOCK STORAGE

BACKGROUND

The following description is provided to assist the understanding of the reader. None of the information provided is admitted to be prior art.

In data storage architectures, a client's data may be stored in a volume. A unit of data, for example a file (or object), is comprised of one or more storage units (e.g. bytes) and can be stored and retrieved from a storage medium such as disk or RAM in a variety of fashions. For example, disk drives in storage systems are divided into logical blocks that are addressed using logical block addresses (LBAs). As another example, an entire file can be stored in a contiguous range of addresses on the storage medium and be accessed given the offset and length of the file. Most modern file systems store files by dividing them into blocks or extents of a fixed size, storing each block in a contiguous section of the storage medium, and then maintaining a list or tree of the blocks that correspond to each file. Some storage systems, such as write-anywhere file layout (WAFL), logical volume manager (LVM), or new technology file system (NTFS), allow multiple objects to refer to the same blocks, typically through a tree structure, to allow for efficient storage of previous versions or "snapshots" of the file system. In some cases, data for a single file or object may be distributed between multiple storage devices, either by a mechanism like RAID which combines several smaller storage media into one larger virtual device, or through a distributed storage system such as Lustre, General Parallel File System, or GlusterFS.

At some point, it is desirable to backup data of the storage system. Traditional backup methods typically utilize backup software that operates independently of the data storage system and manages the backup process. Backup methods exist to backup only the differences since the last full backup (e.g., a differential backup) or to backup only the changes since the last backup (e.g., an incremental backup). However, due to inefficiency of backup software, or to take advantage of a more up-to-date backup or even a completely synchronous in time image for failover and disaster recovery purposes, many administrators are shifting away from traditional backup processes and moving towards data replication methods.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

In general, one aspect of the subject matter described in this specification can be embodied in a system that includes one or more processors configured to retrieve a first metadata file from a first cluster server. The first metadata file includes a first ordered list of block identifiers for data blocks. Each block identifier is used to access a data block stored on one of a first plurality of block servers. Each block identifier is also a hash based on content of its corresponding data block. The first ordered list of block identifiers corresponds to a first plurality of volumes of client metadata stored on the first cluster server. The one or more processors are also configured to retrieve a second metadata file from a second cluster server. The second metadata file includes a second ordered list of block identifiers for data blocks. Each block identifier is used to access a data block stored on one of a second plurality of block servers. Each block identifier is also a hash based on content of its corresponding data block. The second ordered list of block identifiers corresponds to a second plurality of volumes of client metadata stored on the second cluster server. The one or more processors are also configured to compare the first metadata file to the second metadata file to determine a difference list. The difference list includes block identifiers from the first ordered list that differ from block identifiers of the second ordered list. The one or more processors are also configured to send, to the first cluster server, a request for data blocks associated with the block identifiers from the difference list.

Another aspect of the subject matter described in this specification can be embodied in methods including updating a second cluster server that backs up a first cluster server. The updating includes retrieving a first metadata file from a first cluster server. The first metadata file includes a first ordered list of block identifiers for data blocks. Each block identifier is used to access a data block stored on one of a first plurality of block servers. Each block identifier is also a hash based on content of its corresponding data block. The first ordered list of block identifiers corresponds to a first plurality of volumes of client metadata stored on the first cluster server. The updating also includes retrieving a second metadata file from a second cluster server. The second metadata file includes a second ordered list of block identifiers for data blocks. Each block identifier is used to access a data block stored on one of a second plurality of block servers. Each block identifier is also a hash based on content of its corresponding data block. The second ordered list of block identifiers corresponds to a second plurality of volumes of client metadata stored on the second cluster server. The updating also includes comparing the first metadata file to the second metadata file to determine a difference list. The difference list includes block identifiers from the first ordered list that differ from block identifiers of the second ordered list. The updating also includes sending, to the first cluster server, a request for data blocks associated with the block identifiers from the difference list.

Another aspect of the subject matter described in this specification can be embodied in a non-transitory computer-readable medium having instructions stored thereon, that when executed by a computing device cause the computing device to perform operations including updating a second cluster server that backs up a first cluster server. The updating includes retrieving a first metadata file from a first cluster server. The first metadata file includes a first ordered list of block identifiers for data blocks. Each block identifier is used to access a data block stored on one of a first plurality of block servers. Each block identifier is also a hash based on content of its corresponding data block. The first ordered list of block identifiers corresponds to a first plurality of volumes of client metadata stored on the first cluster server. The updating also includes retrieving a second metadata file from a second cluster server. The second metadata file includes a second ordered list of block identifiers for data blocks. Each block identifier is used to access a data block stored on one of a second plurality of block servers. Each block identifier is also a hash based on content of its corresponding data block. The second ordered list of block identifiers corresponds to a second plurality of volumes of client metadata stored on the second cluster server. The updating also includes comparing the first metadata file to the second metadata file to determine a difference list. The difference list includes block identifiers from the first ordered list that differ from block identifiers of the second ordered list. The updating also includes sending, to the first cluster server, a request for data blocks associated with the block identifiers from the difference list.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for a parallel optimized remote synchronization of active block storage, also referred to herein as an incremental block level backup system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

Figure 1:
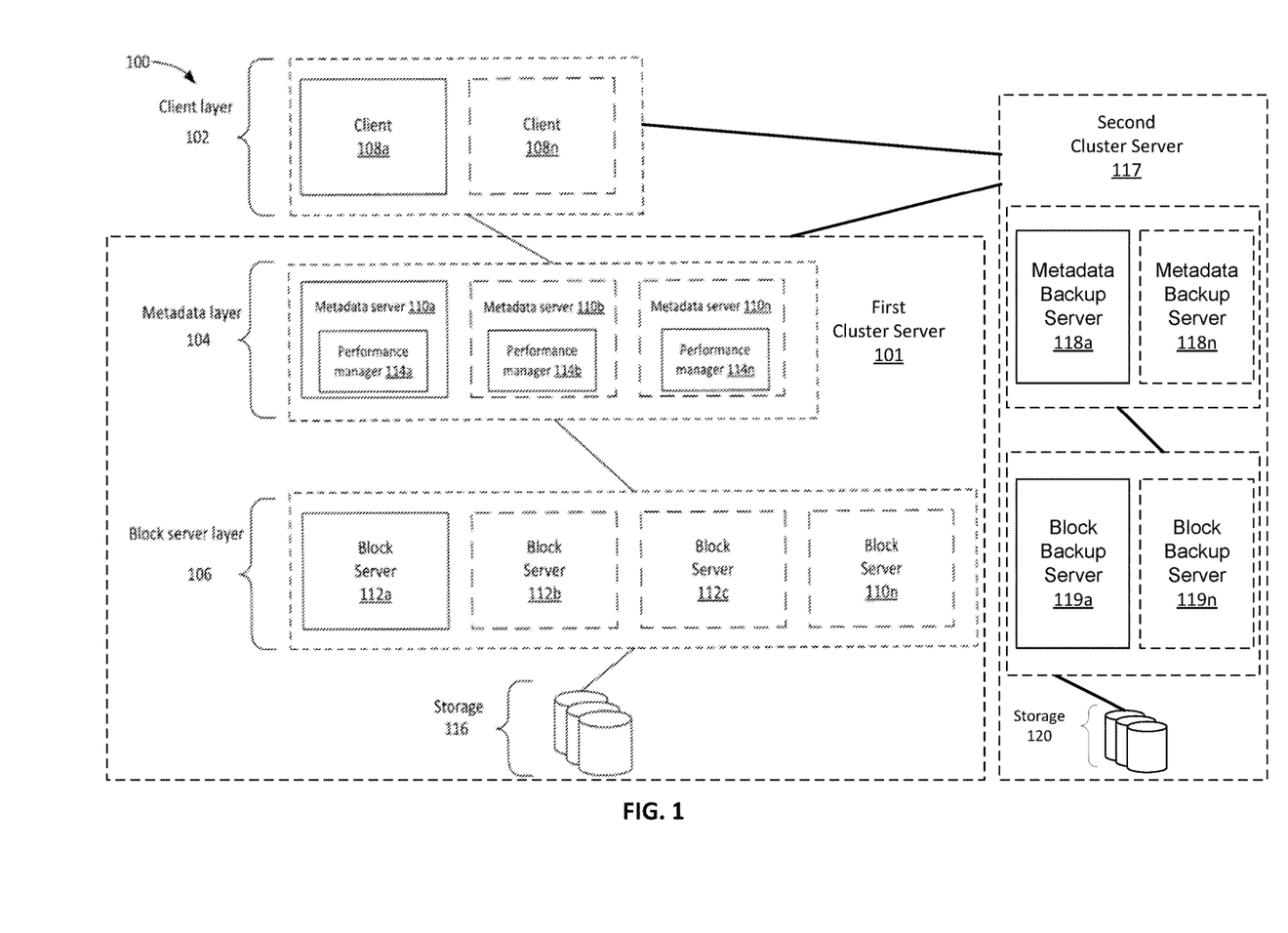
FIG. 1 depicts a simplified system for a storage system in accordance with an illustrative implementation.

FIG. 1 depicts a simplified system for block storage remote synchronization of a storage system 100 in accordance with an illustrative implementation. System 100 includes a client layer 102, a metadata layer 104, a block server layer 106, storage 116, and storage 120.

In general, client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume on one more of the metadata servers 110a-110n. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks or drives that may or may not be networked together. Further, as used herein, a "cluster server" is used to refer to a cluster of individual storage drives that are associated with the block server layer 106 and the metadata layer 104. For example, a first cluster server 101 is depicted in the system 100 as including the metadata servers 110a-110n, the block servers 112a-112n, and the storage 116. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 maintain a mapping between a block identifier and the location of the data block in a storage medium 116 of block server 112. A volume maintained at the metadata layer 104 includes these unique and uniformly random identifiers, and so a volume's data is also evenly distributed throughout the storage 116 of the cluster server 101.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112, a second cluster server 117, and/or backup servers 118 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Parallel Optimized Remote Synchronization of Active Block Storage

A second cluster server 117 has a metadata layer with metadata backup servers 118a-118n, block backup servers 119a-119n, and storage 120. The second cluster server 117 may function similarly to the first cluster server 101. In this embodiment, the second cluster server 117 serves as a backup, or also referred to herein as a replication target, for the first cluster server 101. A backup server may be referred to as a replication target where, for example, a backup server already serves to back up another server, but the backup server should be updated to replicate the server it already backs up. For example, if the cluster server 101 or some part of cluster server 101 goes down or is otherwise unavailable to a client 108, the second cluster server 117 or a component thereof is available to the client 108. In some embodiments, when the first cluster server 101 goes down or is unavailable, a third cluster server may then serve as a backup or replication target to the second cluster server 117 in a similar way that the second cluster server 117 served as a backup or replication target to the first cluster server 101 as described herein. One or more metadata backup servers 118a-118n can interface with the metadata layer 104 and the metadata servers 110 of the first cluster server. The metadata backup servers 118a-118n can also interface directly with the block servers 112 and the block backup servers 119a-119n, which map to the storage 120. The backup servers 118a-118n and the block backup servers 119a-119n are therefore coupled to the storage 120, which stores backups of volume data for clients 108. Storage 120 can include multiple solid state drives (SSDs). In one implementation, storage 120 can be a cluster of individual drives coupled together via a network. The second cluster server 117 can therefore store backup or replication copies of the data blocks of the storage 116 according to any number of formats in the storage 120, and translation from the format of the data blocks of storage 116 may occur. Data may be transferred to and from the second cluster server 117 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol. Compression and data de-duplication may occur in the first cluster server 101 and/or the second cluster server 117.

As discussed above, the servers of metadata layer 104 store and maintain metadata that maps between client layer 102 and block server layer 106, where the metadata maps between the client addressing used by clients 108 (e.g., file names, volume, object names, block numbers, etc.) and block layer addressing (e.g., block identifiers) used in block server layer 106. The components of the second cluster server 117 work in a similar manner. In one embodiment, the metadata includes a list of block identifiers that identifies blocks in a volume. The list may be structured as an ordered list corresponding to a list of blocks. The list may also be structured as the leaves of a hash tree. The block identifiers of the metadata are the same block identifiers as used throughout system 100 as described above. The block identifiers may be hexadecimal numbers, but other representations may be used. Additional metadata may also be included, such as mode numbers, directory pointers, modification dates, file size, client addresses, list details, etc. The block identifiers uniquely identify the data of a block and are a hash based on the content of the data block. The metadata backup servers 118 and the block backup servers 119 of the second cluster server 117 are generally configured to create backups or replications of block level data of one or more volume that is stored in storage 116 of metadata layer 104 and block server layer 106 of the first cluster server 101. The block backup servers 119 may create backups or replications of all of the volume data of block server layer 106 or the block backup servers 119 may create backups or replications of one or more particular volumes (e.g., a volume of a particular client 108). Backups may be full backups of all data, or they may be incremental backups (e.g., data that has changed since a previous backup; also referred to herein as replications and/or synchronizations). In the embodiments discussed below, the entire first cluster server 101 is backed up on second cluster server 117. In alternative embodiments, the system may only backup/replicate/synchronize one or more specific volumes between two cluster servers. In Further, the system may process the backup/replication/synchronization of different volumes in parallel. Thereafter, a block storage remote synchronization process takes place to periodically update and backup the first cluster server 101 to ensure that the second cluster 117 remains an effective backup for the first cluster server 101 even as data is changed, edited, deleted, and/or added in the first cluster server 101.

During an initial backup or replication operation, the entire contents of the first cluster server 101 may be copied onto the second cluster server 117. For example, the second cluster server 117 retrieves a copy of metadata from metadata servers 110 for the client volumes stored therein. The metadata includes a list of block identifiers associated with data blocks of the volume for each client. In an implementation, the metadata includes an ordered list structure of block identifiers. In another implementation, the ordered list is structured as the leaves of a hash tree (e.g., a Merkle tree, etc.) and the metadata includes the hash tree. The metadata is used by the metadata backup servers 118 to retrieve a copy of all of the data blocks of the client volume in order to create an initial backup of the data blocks. The data blocks are retrieved from the storage 116 by sending a request for the data to the metadata servers 110. The requested data is based on the data block identifiers. A request may include a list of the block identifiers of blocks desired to be backed up. In this implementation, all of the data on the first cluster server 101 is requested. In another implementation, the second cluster server 117 may calculate the logical block addresses (LBAs) of blocks desired to be backed up. For example, because each block identifier can represent a known amount of data (e.g., a 4 k block, etc.), an LBA of a block can be calculated based on the location of the block identifier in the ordered list of block identifiers associated with the volume. For example, the position of a block identifier in the ordered list can be used along with the block size to determine the LBA of the data block. As described below, the tree structure can also be used to determine the data blocks that have changed after a previous backup. In this example, the number of leaf nodes to the left of a changed leaf node can be used to calculate the LBA of the data block. In implementations where LBAs are calculated, a request from the second cluster server 117 may include a list of LBAs of blocks to be backed up. The metadata servers 110 route such requests to the block servers 112, which provides the requested data to metadata servers 110. Metadata servers 110 then route the requested data to the second cluster server 117. This arrangement allows the servers of metadata layer 104 to facilitate data transmission between block server layer 106 and the second cluster server 117. In another implementation, the second cluster server 117 may be configured to communicate directly with servers of block server layer 106. Upon retrieval of the requested data, the second cluster server 117 stores the data in storage 120. The data may be stored in storage 120 according to any of the methods discussed herein. The second cluster server 117 may create and maintain statistics and snapshot data corresponding to a particular backup operation. The snapshot data may be used later during a data restoration operation, or during a future backup or replication operation. The second cluster server 117 can also store a copy of the metadata used during a particular backup or replication operation. In another embodiment, the metadata is not stored on the second cluster server 117. Rather, the metadata is stored on another storage device, for example, one or more metadata servers, one or more block servers, or one or more devices remote from the backup system. As a result of the initial backup operation, a complete backup of the data of the first cluster server 101 is created and stored in storage 120 of the second cluster server 117.

Since multiple objects in a storage system as disclosed herein can allow multiple objects to refer to the same blocks, the system allows for efficient storage of previous versions or snapshots of the file system or for efficient use of storage by use of deduplication (the policy of storing the same block only once no matter how many times it is used in different files or volumes). In other words, during a backup or synchronization, the system can take advantage of blocks that already exist on a volume because certain block identifiers and associated data blocks may already exist on a deduplicated storage system. Whether for a full cluster backup or synchronization of one or more specific volumes, there is a chance that a significant number of block identifiers on a first cluster server that is to be copied to the second cluster server will already exist due to the existence of common blocks that are deduplicated in the storage system. This aspect may be particularly advantageous in a virtualized environment where many similar virtual machines (VMs) may exist in volume(s) on the storage. The determination of the existence of a block identifier on the second cluster server is many orders of magnitude less effort/bandwidth than requesting and copying a block identifier's data from the first cluster server.

During a block storage remote synchronization, the system determines a difference list based on current metadata from the metadata servers 110 for any of the client volumes stored on the first cluster server 101. The system can compare the metadata including the ordered list of block identifiers of the first cluster server 101 to the metadata of an ordered list of block identifiers of the second cluster server 117 (e.g., the version of metadata stored during the most recent backup operation, or the initial version of the metadata stored during the initial backup, etc.). Based on the comparison, the system can determine block identifiers (IDs) that are not the same in both the first cluster server 101 and the second cluster server 117 and generate a difference list to use for updating the second cluster server 117. Since the backup second cluster server 117 is the server to be updated, the difference list includes the block IDs from the ordered list of block IDs from the first cluster server 101. In other words, the system should include in the difference list the block IDs corresponding to the data blocks in the first cluster server 101 that are to be copied to the backup second cluster server 117. Stated another way, the difference list will include block IDs that must either be verified to already exist on the second cluster server or if not must be copied.

The system can determine the differences for the difference list using LBAs or leaves of a hash tree as discussed herein. For example, nodes of a hash tree representing block IDs of the first cluster server 101 is compared to nodes of a hash tree representing block IDs of the second cluster server 117, and each node of the ordered lists are traversed and compared. Since the block identifiers are hashes based on content of the corresponding data block, a difference in hash values for corresponding nodes indicates that the data of the block has been changed/updated/deleted/added since the prior backup/update/replication/synchronization. As the block identifiers are part of the storage system 100 and maintained as described herein, the block identifiers can be compared in their native format and immediately used (e.g., added to the difference list, used to request data blocks) without the need to compute the hash values of the block IDs. In an implementation where the metadata includes a hash tree and the ordered list of block identifiers are structured as the leaves of the hash tree, additional performance gains may be realized. Such a hash tree is generally a tree data structure in which every non-leaf node includes the hash of its children nodes. This structure is particularly useful because it allows efficient determination of which data blocks have been updated since a prior backup/update/ replication/synchronization, without the need to compare every node of the list of block identifiers. The use of hash trees is further described in U.S. patent application Ser. No. 14/057,145, which is incorporated herein by reference in its entirety. The determination of changed data blocks by using a hash tree is also discussed in further detail below with reference to FIGS. 2A-2B.

Upon determination of which particular blocks of data have changed since the previous backup/update/replication/ synchronization, the second cluster server 117 can retrieve the blocks of data from storage 116 by sending a request for the changed data block to the metadata servers 110. As discussed above, the metadata servers 110 can facilitate the transfer of data from the block server layers 106. Upon retrieval of the requested changed data blocks, the second cluster server 117 stores the data blocks in storage 120. The second cluster server 117 also updates and stores the current metadata from metadata server 110 used to update the data blocks in the storage 120. As a result of the block storage remote synchronization process, only the data of a volume that has changed since a previous backup operation, and only blocks that don't already exist on the second cluster server (because of blocks existing in other snapshots or in other volumes), are copied from the first cluster server. This provides a number of advantages, including increasing the efficiency of the data backup procedure, and decreasing the overall amount of data being transferred during the backup procedure. Further, the block storage remote synchronization process allows for backing up an entire cluster server's block storage (e.g., storage 116) without regard to what clients 108 map to or use the various data blocks in the storage 116. That is, an entire cluster server, or specific volumes on a cluster server, can be backed up in a way that minimizes traffic between the two cluster servers. For example, the system may only request data blocks that have been changed/deleted/edited/added since a prior update, and which do not already exist in other snapshots or other volumes. The synchronization process can also be performed without continuous communication between the two cluster services, reducing demand on system resources. Further, as disclosed herein, the synchronization process utilizes queues which allows the second cluster server to frequently update itself without exceptionally large communications or data requests at any one given time, which could also tie up significant system resources.

Advantageously, a system using queues and/or batches/ bins can run multiple versions of each of the steps or operations disclosed herein in parallel using the queues and batches to throttle the system resources used by each step. This throttling can be controlled by adjustment of the queue parameters and/or batch sizes and can be manual or adaptive. Adaptive adjustments may be determined and implemented automatically by the system. For example, automatic adjustments could be made due to feedback from a Quality Of Service subsystem or other system resource monitoring to adjust the resources used by this process in such a way to optimize performance while minimizing impact to other subsystems and other activities, including live volume access that is occurring on both cluster servers during the block synchronization process. Further, since the system can be used to perform block synchronization on live volumes that are actively being written, the adjustments to queue parameters and/or batch sizes can be useful when resources should be re-allocated in response to this active writing of live volumes.

Backup servers such as the second cluster server 117 may also provide an application programming interface (API) in order to allow clients 108 or data backup software to interface with the synchronization systems described herein. For example, the API may allow the second cluster server 117 to send statistics related to backed up data and synchronization operations to and from clients 108 or backup software. As another example, the API may allow the second cluster server 117 to receive a request to initiate a synchronization operation. The API can also allow for synchronization operations to be scheduled as desired by clients 108 or as controlled by data backup software. Other API functionality is also envisioned.

Figure 2A:
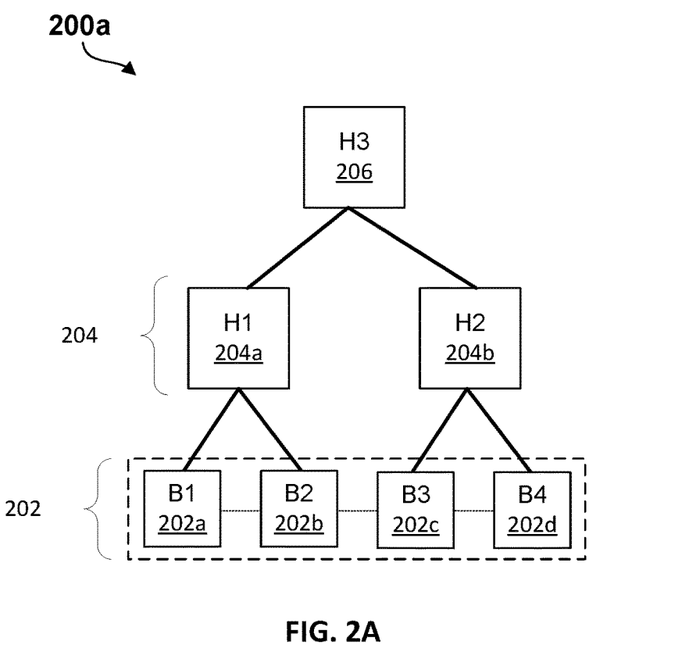
FIG. 2A depicts a hash tree in accordance with an illustrative implementation.

Referring to FIG. 2A, a hash tree 200a is shown in accordance with an illustrative implementation. The hash tree 200a may be a hash tree that is provided by a first cluster server to be compared to a similar hash tree of the data stored in a second backup cluster server. Although depicted as a binary hash tree, hash tree 200a (and hash trees describer herein) may have any number of child nodes/branches. Hash tree 200a represents the data of a cluster server which could include the volumes of any number of clients, and can be provided along with additional metadata describing details related to the tree structure. For example, the metadata may include statistics regarding node counts, leaf-node counts, tree-depth, indexes to sub-trees, etc. A backup cluster server may store the additional metadata for future use. Hash tree 200a includes leaves 202a-d, internal nodes 204a-b, and root node 206. Leaves 202a-d store block identifies B1-B4, respectively. In an implementation, leaves 202a-d may be structured as an ordered list that is indexed by its parent nodes, which in this example are internal nodes 204. Block identifiers B1-B4 are identifiers as described herein (e.g., a hash of the corresponding data block's content), and each uniquely identify a particular block ID of the volume in the metadata servers. Hash tree 200a further includes non-leaf internal nodes 204a-b and non-leaf root node 206. The value stored by each non-leaf node is the hash of that node's children values. For example, hash H1 is the hash of block identifiers B1 and B2, hash H2 is the hash of block identifiers B3 and B4, and hash H3 is the hash of hashes H1 and H2. A copy of hash tree 200a (and any accompanying metadata) may be stored by the second cluster server 117 when a backup/update/replication/synchronization operation is performed.

Figure 2B:
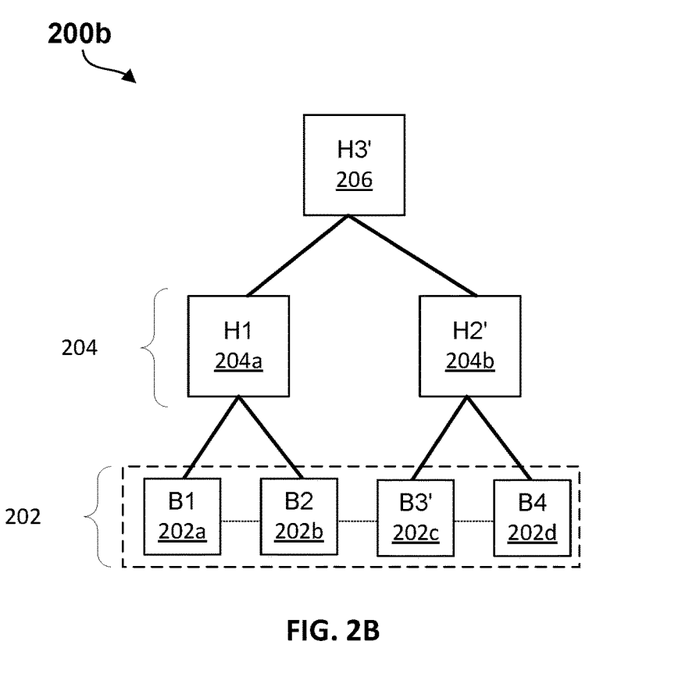
FIG. 2B depicts the hash tree illustrated in FIG. 2A, with updated node hashes, in accordance with an illustrative implementation.

Referring to FIG. 2B, the hash tree 200*a* of FIG. 2A is shown at a later time instance, as hash tree 200*b*. For example, hash tree 200*a* may have been provided by metadata servers 110 during an initial backup operation and stored by the second cluster server 117, and hash tree 200*b* may have been provided by metadata servers 110 during a subsequent block storage remote synchronization process. Both hash trees 200*a*-*b* represent the block IDs stored on a particular volume of the metadata servers 110 or the metadata backup servers 118, respectively. As depicted, the block identifier B3 of leaf node 202*c* has changed to become block identifier B3' at some time since the previous backup/update/replication/synchronization. For example, new or updated data may have been written to the block referenced by block identifier B3. Because of the structure of the hash tree, the change of block identifier from B3 to B3' causes updates in hashes to propagate upward through the parent node to the root node. Specifically, hash H2 is recalculated to become H2', and hash H3 is recalculated to become to H3'. During a backup/update/replication/synchronization operation, the second cluster server 117 may walk the hash tree 200*b*, and compare the nodes of hash tree 200*b* to corresponding nodes of hash tree 200*a*. A difference between corresponding non-leaf node hashes indicates that a block identifier (and at least one corresponding data block) below that non-leaf node has changed. If the hashes of corresponding non-leaf nodes are equal, this indicates that the block identifiers below that non-leaf node have not changed (and therefore corresponding data blocks below that non-leaf node have also not changed). Thus, the subtree of nodes below an unchanged non-leaf node can be advantageously skipped from further processing, saving system resources. In this manner, a performance increase may be realized as the entire hash tree does not need to be traversed in every synchronization process. As an example with reference to FIG. 2B, the second cluster server 117 may compare hash tree 200*b* to hash tree 200*a* as follows (although analysis performed by the second cluster server 117 is not limited to the following operations or order of operations):

1. Node 206 is analyzed to determine that hash H3' is different from its previous value of H3, and therefore hash trees 200*a*-*b* need to be further analyzed.
2. Node 204*a* is analyzed to determine that hash H1 has not changed, and the subtree of node 204*a* (leaf nodes 202*a*-*b*) may be skipped from further analysis.
3. Node 204*b* is analyzed to determine that hash H2' is different from its previous value of H2, therefore the subtree of node 204*b* (leaf nodes 202*c*-*d*) must be analyzed.
4. Leaf node 202*c* is analyzed to determine that block identifier B3' is different from its previous value of B3. Thus, the data block corresponding to block identifier B3' needs to be backed up by backup server 118, since its data as changed since the previous backup operation.
5. Leaf node 202*d* is analyzed to determine that block identifier B4 has not changed, and traversal of hash trees 200*a*-*b* is complete.

After performing the above sample analysis, the system (e.g., processors of the second cluster server 117) can compile the identified block IDs that have changed and are updated by the synchronization process into a difference list. The difference list is used as disclosed herein to retrieve data blocks based on the block identifier(s) in the difference list.

In this example, the second cluster server 117 may send a request to the first cluster server 101 for the data block identified by block identifier B3'. Upon receipt of the data block, the second cluster server 117 stores the data block according to the new block ID (B3'), and stores hash tree 200*b* (along with any accompanying metadata) for use in future backup and/or restoration operations. In some embodiments, a difference list is not compiled all at once for a server. For example, in one implementation, a difference list may be a list of leaf nodes that differ between two servers, where each leaf node contains 256 block IDs. These differing leaf nodes can then be processed, in parallel, by reading and comparing the list of block IDs for each differing leaf node to determine differing block IDs, which are then added to a queue and split into batches to be processed, in parallel, in the steps described herein.

In one implementation using trees, the second cluster server 117 may retrieve the metadata from the metadata servers 110 by requesting only child nodes whose parent node has changed. For example, starting with the root, if the root node has changed the children of the root node can then be requested. These nodes can then be compared to corresponding nodes in the previously stored tree to determine if those have changed. Children of any node that has changed can then be retrieved. This process can be repeated until leaf nodes are retrieved. For example, with reference to FIGS. 2A-2B, hash tree 200*b* may be the current metadata from metadata servers 110, and hash tree 200*a* may be stored metadata from a previous backup operation. The second cluster server 117 may first retrieve root node 206 and analyze it to determine that hash H3' is different from its previous value of H3. In response, the second cluster server 117 may then request nodes 204*a*-*b* from interior node level 204. Node 204*a* is analyzed to determine that hash H1 has not changed, and leaf nodes 202*a*-*b* may be skipped from further requests/analysis. Node 204*b* is analyzed to determine that hash H2' is different from its previous value of H2, and thus the second cluster server 117 may proceed to request appropriate nodes of leaf level 202 (leaves 202*c*-*d*). Analysis may then continue as described above to determine that block identifier B3' is different from its previous value of B3 and that the data block corresponding to block identifier B3' needs to be backed up. This implementation may allow for performance increases by minimizing data that is transmitted between the second cluster server 117 and metadata servers 110 during the retrieval of metadata.

At some point, it may be desirable by clients 108 or an administrator of system 100 to increase the volume size assigned to a client 108 by adding more data blocks of storage space. In this situation, with the second cluster server 117 implementations configured to utilize metadata of an ordered list of block identifiers, any newly added block identifiers (corresponding to the new data blocks) may be appended to the end of the ordered list. Thus, during a backup/update/replication/synchronization operation, if the second cluster server 117 receives metadata of an ordered list that has more elements than that of metadata from a prior backup operation, backup server 118 can determine the newly added data blocks that must be backed up based on the additional list elements. The backup operation may proceed as described above with respect to the remaining elements.

Figure 2C:
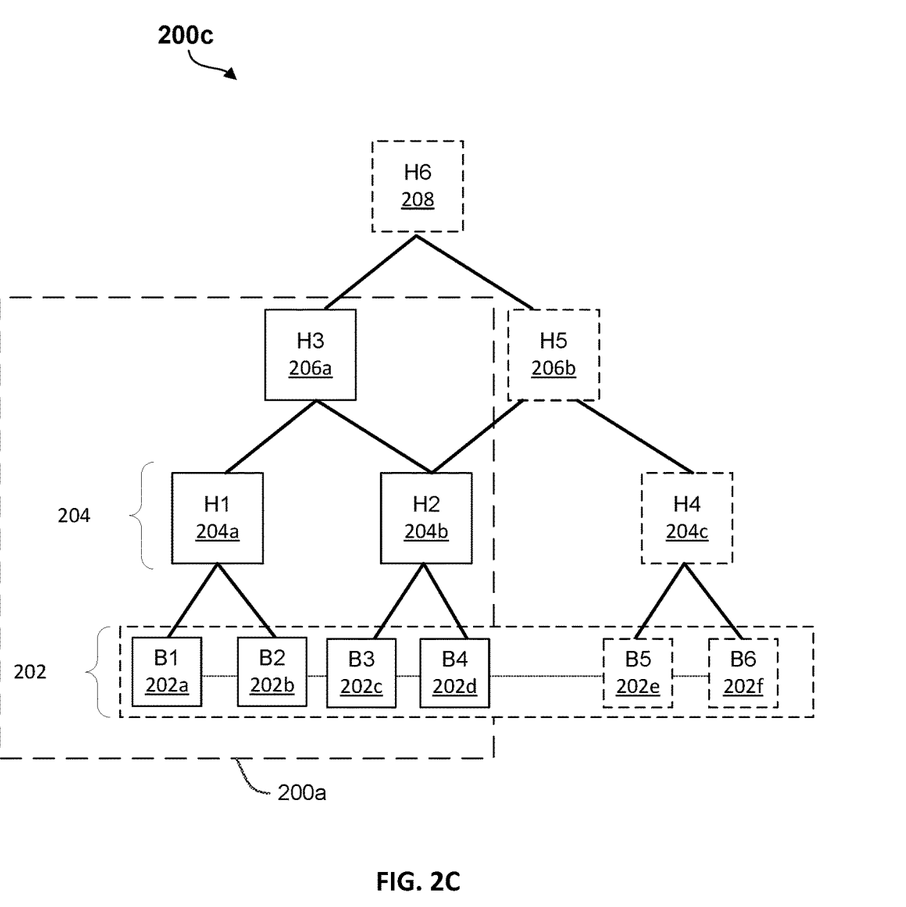
FIG. 2C depicts the hash tree illustrated in FIG. 2A, with newly added leaves, in accordance with an illustrative implementation.

FIG. 2C depicts the result of an increased volume size for implementations configured to utilize metadata of a hash tree. Hash tree 200*c* is based on hash tree 200*a* (which is included as a subtree and is denoted by a dashed box). Leaves 202*e*-*f* have been newly added to the hash tree and include block identifiers B5-B6, which correspond to the newly added data blocks of the increased volume size. As a result of the volume increase, hash tree 200*a* is restructured such that root node 206 becomes internal node 206*a*, and a new root node 208 is created. Further, internal nodes 206*b* and 204*c* are added to maintain the tree structure. Hashes H4-H6 are calculated based on the respective child values as described above. After such a restructuring of a hash tree, a backup/update/replication/synchronization operation may proceed as described above. However, the second cluster server 117 can determine the newly added data blocks that must be backed up based on a new root node or additional leaves. Also, an implementation may make use of additional metadata that includes the indexes of the root nodes of previously stored trees. In this manner, the second cluster server 117 may access the indexes to locate and compare the root node of a prior tree with the corresponding internal node of the current tree (e.g., root node 206 can be compared to internal node 206*a*.). If the comparison indicates that the hashes have not changed, then the second cluster server 117 may skip analyzing the subtree of the internal node, and a performance gain may be realized.

At some point, it may be desirable by clients 108 or an administrator of system 100 to reduce the volume size assigned to a client 108 by removing data blocks of storage space. In this situation, with the second cluster server 117 implementations configured to utilize metadata of an ordered list of block identifiers, any removed block identifiers (corresponding to removed data blocks) may be removed from the end of the ordered list. Thus, during a backup/update/replication/synchronization operation, if the second cluster server 117 receives metadata of an ordered list that has fewer elements than that of metadata from a prior backup operation, the second cluster server 117 can determine the backed up data blocks that may be removed based on the additional list elements in the stored list from the prior backup. The backup operation may proceed as described above with respect to the remaining elements. With the second cluster server 117 implementations configured to utilize metadata of a hash tree including leaves that are a list of block identifiers, the second cluster server 117 may compare the trees (e.g. depth of the trees, leaf node count, etc.) to determine that there has been a change in volume size. In another implementation the size of the volume can be part of the metadata received by the backup servers, and this metadata can be compared to a previously received volume size to determine that a change in volume has occurred. The second cluster server 117 may then determine the position of the current tree within the stored hash tree. After locating the position of the current root node, the leaf nodes (and corresponding parent nodes) that are not within the subtree of the current root node can be ignored. Once the corresponding root nodes have been determined, the backup operation may then proceed as described above with respect to the remaining nodes.

Figure 3:
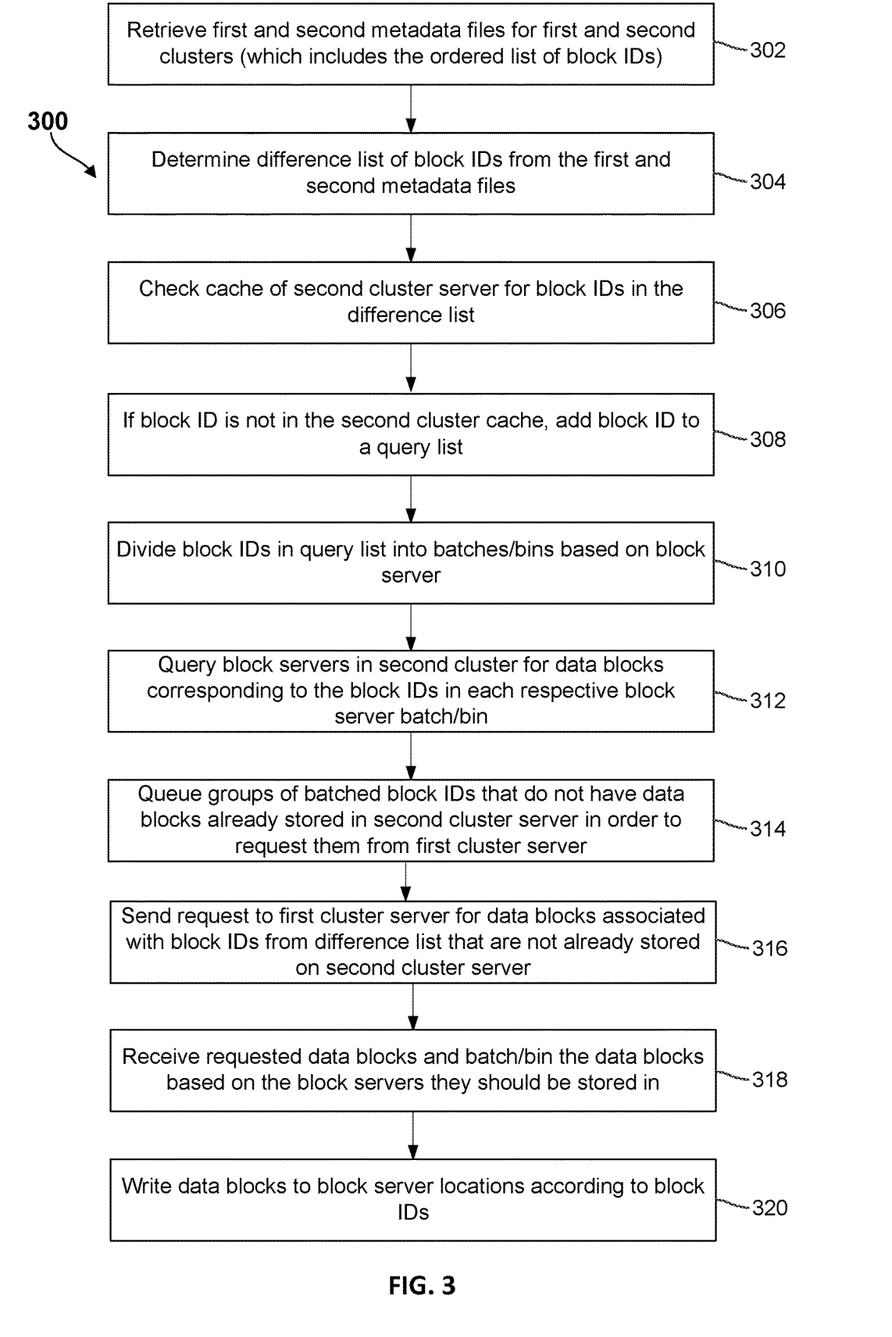
FIG. 3 shows a flow diagram of a block storage remote synchronization process in accordance with an illustrative implementation.

FIG. 3 shows a flow diagram of a block storage remote synchronization process 300 in accordance with an illustrative implementation. In alternative embodiments, fewer, additional, and/or different steps may be performed. Also, the use of a flow diagram is not meant to be limiting with respect to the order of steps performed. The procedure 300 can be implemented on a computing device. In one implementation, the procedure 300 is encoded on a computer-readable medium that contains instructions that, when executed by a computing device, cause the computing device to perform operations of the procedure 300. According to different embodiments, at least a portion of the various types of functions, operations, actions, and/or other features provided by the parallel optimized remote synchronization of active block storage, also referred to herein incremental block level backup/update/replication/synchronization procedure, may be implemented at one or more nodes and/or volumes of the storage system. The process 300 demonstrates an illustrative embodiment for updating/synchronizing a second cluster server that backs up a first cluster server. The second cluster server is a backup server. The second cluster server may have one or more processors that perform the functions of the process 300, or the processor(s) that perform some or all of the operations in the process 300 may be a part of another device or system.

In an operation 302, the system retrieves first and second metadata files corresponding to the first and second cluster servers. In this example, the first cluster server can be thought of as the live cluster server, while the second cluster server is the backup cluster server. These metadata files include an ordered list of block IDs for each respective cluster server. In some embodiments, the volume(s) being backed up from the live cluster server are live volumes that are fully active while the block synchronization is occurring. The backup cluster server may also be a live cluster server for other volumes. In other words, the backup server may not necessarily be a dedicated backup server, but may have other purposes or activities that use its resources. In this way, a cluster server may run other operations without the operations disclosed herein monopolizing resources on either of the cluster servers.

For example, the first retrieved metadata file from the first cluster server includes a first ordered list of block identifiers for data blocks. Each block identifier is used to access a data block stored on one of a first plurality of block servers. Each block identifier of the first ordered list may be a hash based on content of its corresponding data block. The first ordered list of block identifiers also corresponds to a first plurality of volumes of client metadata stored on the first cluster server. In other words, in one embodiment, all of the data blocks of the first cluster server are represented by block IDs in the first ordered list of block IDs. In other embodiments, the systems and methods disclosed herein acquire and process the first ordered lists of block IDs on a per-volume basis, processing multiple volumes in parallel, not necessarily a single list for the entire cluster.

Similarly, the second retrieved metadata file from the second cluster server includes a second ordered list of block identifiers for data blocks. Each block identifier is used to access a data block stored on one of a second plurality of block servers. Each block identifier of the second ordered list may be a hash based on content of its corresponding data block. The second ordered list of block identifiers corresponds to a second plurality of volumes of client metadata stored on the second cluster server. In other words, all of the data blocks of the second cluster server are represented by block IDs in the second ordered list of block IDs. In other embodiments, the systems and methods disclosed herein acquire and process the first ordered lists of block IDs on a per-volume basis, processing multiple volumes in parallel, not necessarily a single list for the entire cluster.

In an operation 304, the system determines a difference list of block IDs from the first and second metadata files. In other words, the system compares the first metadata file to the second metadata file to determine the difference list, and the difference list includes block identifiers from the first ordered list that differ from block identifiers of the second ordered list. The difference list includes block IDs from the first ordered list corresponding to the first cluster server because the second cluster server is the backup server and the server that needs to potentially be changed to match the current state of the first cluster server. Accordingly, the difference list uses block IDs corresponding to what is stored on the first cluster server to update the second cluster server.

In an illustrative embodiment for determining the difference list, the first ordered list of block identifiers and the second ordered list of block identifiers each have N possible block identifier storage positions, where N is an integer above zero. Thus, the system compares the first metadata file to the second metadata file to determine the difference list. In some embodiments, the difference list is an ordered list of leaf nodes that are different in a volume. The comparison is performed by comparing the N possible block identifier storage positions in the first ordered list to the N number of possible block identifier storage positions in the second ordered list. For example, a first possible block identifier storage position in the first ordered list is compared to a first possible block identifier storage position in the second ordered list. The positions are referred to as possible block identifier storage positions because some positions (also referred to herein as LBAs) may not currently have a stored block identifier and corresponding data block. A second possible block identifier storage position in the first ordered list is also compared to a second possible block identifier storage position in the second ordered list. Any subsequent possible block identifier storage positions in the first and second ordered lists are also compared until the Nth possible block identifier storage position in the first ordered list is compared to the Nth possible block identifier storage position in the second ordered list. In alternative embodiments, a hash tree is used to compare the possible storage positions of the first and second ordered lists. In such an embodiment, all N possible storage systems are still compared, but not all positions are directly compared unless necessitated by widespread differences between the storage positions (e.g., the first cluster server has had all of its data removed because a client no longer uses the system). When a possible block identifier storage position of the first ordered list is different from a possible block identifier storage position of the second ordered list and a first block identifier is stored in the possible block identifier storage position of the first ordered list, the system adds the first block identifier to the difference list. When a possible block identifier storage position of the first ordered list is different from a possible block identifier storage position of the second ordered list and there is no block identifier stored in the possible block identifier storage position of the first ordered list, the system deletes a block identifier stored in the second cluster server at the possible block identifier storage position of the second ordered list to match the absence of a block identifier in that position in the first cluster server. Relatedly, the system may also delete the corresponding data block. In an alternative embodiment, the system may not immediately delete the data block, but it may be later deleted by a garbage clearing function.

In an operation 306, the system determines, before a request for data is sent, whether any of the data blocks associated with the block identifiers in the difference list are in a cache of the second cluster server. When the second cluster server is updating/synchronizing, the second cluster system may utilize a cache. For example, if the second cluster server has existing block IDs and corresponding data blocks that it will write to its metadata backup servers and block backup servers, those existing block IDs and corresponding data blocks may be stored in a cache until they are written to the metadata backup servers and block backup servers. Accordingly, there may be occasions where a block ID and/or data block that the second cluster server needs to synchronize are already in the cache of the second cluster server. Thus, the system can preserve resources and bandwidth by using the data and/or block ID already in the cache instead of requesting said data and/or block ID from the first cluster server. In another embodiment, a determination is made to see if the block IDs in the difference list (in batches, running in parallel) are in a cached representation of the block IDs that are in the cache on the second cluster server. In other words, the check is made against the set of block IDs that were in the cache at the time the synchronization process starts. This can be done to increase performance by not needing to do a full cache check that has more overhead and would have more impact on live volume operations. This increases performance of this step at the expense of possible misses of updates to the cache after the cached representation of the cache was created. However, the operations disclosed herein in FIG. 5 and its associated description exist to maintain correctness in the synchronization process in light of this use of cached information.

If the system does find block IDs from the difference list in the cache of the second cluster server, the second cluster server already has the data and the next block ID can be handled. This can occur because each block identifier indicates a location on one of the first or second plurality of block servers where a data block associated with each block identifier should be stored. In another implementation the system can retrieve, from the cache of the second cluster server, any of the data blocks associated with the block identifiers from the difference list it can from the cache. The system can then write the data blocks retrieved from the cache of the second cluster server to the appropriate block servers of the second cluster server according to the block IDs.

Accordingly, in an operation 308, the system adds block IDs that were not found in the cache to a query list. In an operation 310, the system divides block IDs from the query list (i.e., the difference list minus block IDs that were located in the cache of the second cluster server) into batches/bins based on the corresponding block server that each block ID refers to. That is, block IDs each refer to a specific block server within a cluster server, so the block IDs are grouped together in batches/bins according to which block server they reference or correspond to. In other words, the system groups the block IDs from the difference list into difference list batches based the location indicated by each block ID. Each of the batches/bins therefore correspond to one block server in the first or second plurality of block servers.

In an operation 312, the system queries the block servers in the second cluster server for data blocks that correspond to the block IDs in each respective block server batch/bin. In other words, the system determines, before the request from the second cluster server to the first cluster server for data blocks is sent, whether any of the data blocks associated with the block identifiers in each batch are already stored on one of the second plurality of block servers. Using the bins advantageously offers increased performance and efficiency because only a portion of a whole cluster server (i.e., the block server that a block ID maps to) is queried for a data block matching each block ID. If the system locates any data blocks that the block IDs refer to from the query/difference list, the system can remove the block IDs from the query/difference list because the found data block in the second cluster server already matches the first cluster (that is, the synchronization is achieved); if such data blocks are found, the corresponding block IDs can be removed from the difference list batches/bins because they are already stored on one of the second cluster server block servers. Advantageously, this keeps the second cluster server from utilizing bandwidth between cluster servers to request data blocks that are already present on the second cluster server, adding efficiency to the system. In an alternative embodiment, a server system may store a particular data block on two different block servers of the first plurality of block servers. In this way, the first plurality of block servers does not have a single point of failure. In such an embodiment, the methods and systems described herein may be utilized to synchronize/update the first plurality of block servers to the second plurality of block servers such that a particular data block with a corresponding block ID is located on at least two of the first plurality of block servers and at least two of the second plurality of block servers. Accordingly, in the operation 312, the system may determine if the data block exists on both of the at least two of the second plurality of block servers in accordance with the redundancy policies of a particular, client, system, or service. If the operation 312 finds the data block on only one of the second plurality of block servers, the system may duplicate/synchronize the data block onto a second block server of the second plurality of block servers, or may request the data block from the first plurality of block servers. In another embodiment, the block IDs (metadata) may also be stored redundantly on multiple metadata servers in a single cluster. That is, the block ID list associated with the volume of each client or user may be stored on at least two metadata servers in each of a first and second cluster once a synchronization/update is complete. In another alternative embodiment, the system may include even more redundancies. For example, a data block and/or metadata related to data blocks may be stored at three or more locations in the first cluster server as well as in the second cluster server. Accordingly, even more extensively redundant systems may be synchronized/updated in the same way.

In an operation 314, the system queues the groups of batched block IDs that do not have data blocks already stored on the second cluster server in order to request the data blocks from the first cluster server using the block IDs in the queue. In other words, the system adds, to a queue, the block identifiers from the difference list. A queue can add efficiency because it can request the data blocks when traffic in the system is relatively low, and suspend requests when the system is strained.

In an operation 316, the system sends a request or requests to the first cluster server for the batched data blocks associated with the block IDs from the difference list that were not in the second server cache or block servers (i.e., the data blocks that are not already on the second cluster server). In other words, the system sends, to the first cluster server, a request for data blocks associated with the block identifiers from the difference list/queue. In some embodiments, the block ID may not be found in the cache or block servers but the blocks are on the second cluster server. Such instances may be handled, for example, by the process described in FIG. 5. Requests for batched data blocks can include the block IDs organized by the aforementioned difference list batches/bins. In this way, the first cluster server already has the binned block IDs to more easily request the corresponding data blocks. In another embodiment, the first cluster server may organized the block IDs in a request into batches/bins. In yet another embodiment, the first cluster server may also utilize a queue similar to the second cluster server as described herein. In another alternative embodiment, the first and/or second cluster servers may utilize queues in conjunction with the batches/bins. For example, a queue may exist in a cluster server for each block server, such that a busy block server may have a queue of batched/binned block ID request waiting for the traffic to/from that block server to slow. Such a functionality improves the efficiency of the system and a cluster and/or block server in particular.

In an operation 318, the system receives the requested data blocks. In other words, the second cluster server receives the data blocks associated with the block identifiers in the queue that were in the request sent to the first cluster server. The system further groups, into batches/bins, the data blocks based on which of the block servers the received data blocks belong in as indicated by the block identifiers associated with the data blocks. As disclosed herein, adjustment of the queue parameters and/or batch sizes can be performed, and can be manual or adaptive. Advantageously, this can be done to optimize performance of the system while minimizing impact to other subsystems and other activities.

In an operation 320, the system writes the data blocks from the batches/bins onto the second plurality of block servers according the block identifiers associated with the data blocks. Thus the second cluster server becomes synchronized/updated as a backup server to the entire first cluster server.

In another embodiment, the retrieval of the metadata and the comparison of the metadata to other metadata is performed by a device other than a backup server (e.g., by one or more devices of the storage system). For example, a storage device remote from the backup server may access metadata on the storage device, or may retrieve the metadata from another device, for example, from the metadata server. The storage device may analyze the metadata to determine changes in block identifiers as discussed above. Based on any changed block identifiers found during the analysis, a synchronization can be performed by transferring data to the backup server. For example, based on the identifiers of the changed data blocks, the storage device may transfer only the changed data blocks to the backup server to be backed up. The backup server may store received data blocks as described herein. The metadata used for the incremental backup can be stored by the storage device or can be transferred to another device (e.g., the metadata server) to be stored for future use.

Figure 4:
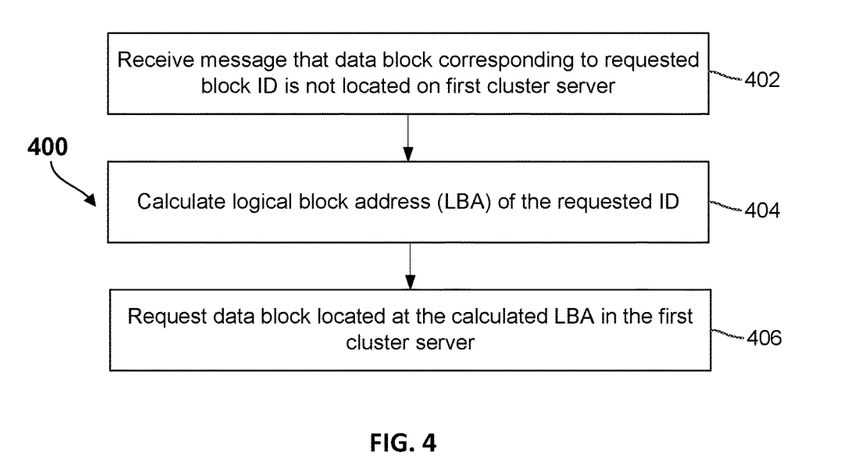
FIG. 4 shows a flow diagram of an aspect of a block storage remote synchronization process in accordance with an illustrative implementation.

FIG. 4 shows a flow diagram of an aspect of a block storage remote synchronization process 400 in accordance with an illustrative implementation. In alternative embodiments, fewer, additional, and/or different steps may be performed. Also, the use of a flow diagram is not meant to be limiting with respect to the order of steps performed. Further, the system may implement multiple instances of any of the methods disclosed herein, and may implement such methods in parallel.

In an operation 402, the system receives a message that a data block corresponding to a requested block ID is not located on the first cluster server (e.g., an error message). In other words, the system determines a missing data block comprising at least one of the data blocks associated with the block identifiers in the queue are not stored in the first cluster server.

In an operation 404, the system calculates a logical block address (LBA) of the missing data block based on the second ordered list of block identifiers. In other words, as discussed herein the system can determine an LBA based on information the system has about the second ordered list and a particular block IDs position within that ordered list.

In an operation 406, the system sends, to the first cluster server, a request for missing data block, wherein the request comprises the LBA. In other words, the second cluster server requests a data block located at the calculated LBA in the first cluster server at the corresponding LBA in the first cluster server. The first cluster server can then send the data block to the second cluster server for storage/writing at the LBA in the second cluster server. Although such a scenario makes the likelihood of an error for the original block ID likely, the goal of synchronization is still met because the data block in a particular storage location on the first cluster server has been copied/sent to the corresponding location on the second cluster server. Further, once the second cluster server has the data block, the block ID can either accompany the data block or can be derived from the data block so that the metadata server of the second cluster server can also be updated/synchronized with the correct block ID.

Figure 5:
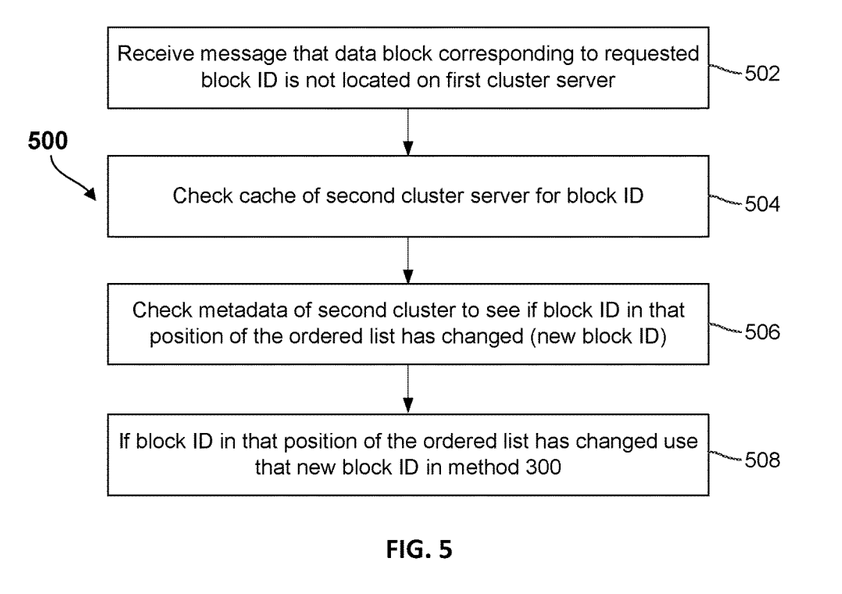
FIG. 5 shows a flow diagram of an aspect of a block storage remote synchronization process in accordance with an illustrative implementation.

FIG. 5 shows a flow diagram of an aspect of a block storage remote synchronization process 500 in accordance with an illustrative implementation. In alternative embodiments, fewer, additional, and/or different steps may be performed. Also, the use of a flow diagram is not meant to be limiting with respect to the order of steps performed. Further, the system may implement multiple instances of any of the methods disclosed herein, and may implement such methods in parallel.

The process 500 shows an alternative embodiment to the process 400 discussed above with respect to steps for handling an error message that the first cluster server does not have a requested data block. In an operation 502, the system receives a message that a data block corresponding to a requested block ID is not located on the first cluster server. In other words, the system determines missing data blocks including at least one of the data blocks associated with the block identifiers in the queue that are not stored in the first cluster server.

In an operation 504, the system checks the cache of the second cluster server for the block ID. In other words, the system determines whether block identifiers associated with the missing data blocks are in a cache of the second cluster server. Here, the cache check may be full check of the cache. That is, the system may check the cache for the block ID rather than just a cached representation of the block IDs in order to run an exhaustive check for the block ID in the event that second cluster was updated or changed after the backup/replication/synchronization process started.

In an operation 506, the system checks metadata of the second cluster to see if the block ID associated with the missing data block in that position of the ordered list has changed (i.e., has the block ID been changed since the difference list was compiled). In other words, the system retrieves, from the second cluster server, when the block identifiers associated with the missing data blocks are not in the cache of the second cluster server, a second version of the second metadata file and determines whether the block identifiers associated with the missing data blocks have changed in the second version of the second metadata file or a portion of it. If a new block ID is found, the system replaces the incorrect block ID in the difference list such that the block identifiers associated with the missing data blocks are changed to new block identifiers from the second version of the second metadata file.

In an operation 508, the new block ID from the second version of the second metadata file can then be added to the difference list and used in the process 300 as described herein. In other words, once a different block ID is determined, the system can go through the process 300 to attempt to find the data block associate with the block ID in order to properly synchronize the first cluster server and the second cluster server. In one embodiment, the second metadata file may be cached, fully or in part.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system comprising:
a first cluster server, comprising a first memory and a first one or more processors, backed up by a second cluster server comprising a second memory and a second one or more processors configured to:
retrieve a first metadata file from the first cluster server, wherein the first cluster server is different from the second cluster server, wherein the first metadata file comprises a first ordered list of block identifiers for data blocks, wherein each block identifier is used to access a data block stored on one of a first plurality of block servers, wherein each block identifier is a hash based on content of its corresponding data block, and wherein the first ordered list of block identifiers corresponds to a first plurality of volumes of client metadata stored on the first cluster server;
retrieve a second metadata file from the second cluster server, wherein the second metadata file comprises a second ordered list of block identifiers for data blocks, wherein each block identifier is used to access a data block stored on one of a second plurality of block servers, wherein each block identifier is a hash based on content of its corresponding data block, and wherein the second ordered list of block identifiers corresponds to a second plurality of volumes of client metadata stored on the second cluster server;
compare the first metadata file to the second metadata file to determine a difference list, wherein the difference list comprises block identifiers from the first ordered list that differ from block identifiers of the second ordered list; and
send, to the first cluster server, a request for data blocks, wherein the request comprises the block identifiers from the difference list.

2. The system of claim 1, wherein the one or more processors are further configured to:

determine, before the request is sent, whether any of the data blocks associated with the block identifiers from the difference list are in a cache of the second cluster server;
retrieve, from the cache of the second cluster server, any of the data blocks associated with the block identifiers from the difference list; and
write the data blocks retrieved from the cache of the second cluster server to the second plurality of block servers.

3. The system of claim 1, wherein each block identifier indicates a location on one of the first or second plurality of block servers where a data block associated with each block identifier should be stored, and wherein the one or more processors are further configured to:
group into difference list batches the block identifiers from the difference list based the location indicated by each identifier, wherein each of the batches correspond to one block server in the first or second plurality of block servers;
determine, before the request is sent, whether any of the data blocks associated with the block identifiers in each batch are stored on one of the second plurality of block servers; and
remove, from the difference list batches, any block identifiers determined to be already stored on one of the second plurality of block servers.

4. The system of claim 3, wherein the request comprises the difference list batches.

5. The system of claim 1, wherein each block identifier indicates at least two locations on one of the first or second plurality of block servers where a data block associated with each block identifier should be stored, and wherein the one or more processors are further configured to:
group into difference list batches the block identifiers from the difference list based the location indicated by each identifier, wherein each of the batches correspond to at least two block servers in the first or second plurality of block servers;
determine, before the request is sent, whether any of the data blocks associated with the block identifiers in each batch are stored on at least two of the second plurality of block servers; and
remove, from the difference list batches, any block identifiers determined to be already stored on at least two of the second plurality of block servers.

6. The system of claim 1, wherein the one or more processors are further configured to:
add, to a queue, the block identifiers from the difference list; and
request, from the first cluster server, the data blocks associated with the block identifiers in the queue.

7. The system of claim 6, wherein the one or more processors are further configured to:
receive, at the second cluster server, the data blocks associated with the block identifiers in the queue;
group into batches the data blocks based on which of the second plurality of block servers the data blocks should be written to as indicated by the block identifiers associated with the data blocks; and
write the data blocks from the batches onto the second plurality of block servers according the block identifiers associated with the data blocks.

8. The system of claim 6, wherein the one or more processors are further configured to:

determine a missing data block comprising at least one of the data blocks associated with the block identifiers in the queue that are not stored in the first cluster server;

calculate a logical block address (LBA) of the missing data block based on the second ordered list of block identifiers; and send, to the first cluster server, a request for missing data block, wherein the request comprises the LBA.

9. The system of claim 6, wherein the one or more processors are further configured to:

determine missing data blocks comprising at least one of the data blocks associated with the block identifiers in the queue that are not stored in the first cluster server;

determine whether block identifiers associated with the missing data blocks are in a cache of the second cluster server;

retrieve from the second cluster server, when the block identifiers associated with the missing data blocks are not in the cache of the second cluster server, a second version of the second metadata file; and determine whether the block identifiers associated with the missing data blocks have changed in the second version of the second metadata file.

10. The system of claim 9, wherein the one or more processors are further configured to replace in the difference list the block identifiers associated with the missing data blocks that have changed with new block identifiers from the second version of the second metadata file.

11. A method comprising:

updating a second cluster server, having a second memory and a second one or more processors, that backs up a first cluster server having a first memory and a second one or more processors, wherein the updating comprises:

retrieving, by the second one or more processors of the second cluster server, a first metadata file from a first cluster server, wherein the first cluster server is different from the second cluster server, wherein the first metadata file comprises a first ordered list of block identifiers for data blocks, wherein each block identifier is used to access a data block stored on one of a first plurality of block servers, wherein each block identifier is a hash based on content of its corresponding data block, and wherein the first ordered list of block identifiers corresponds to a first plurality of volumes of client metadata stored on the first cluster server;

retrieving, by the second one or more processors, a second metadata file from a second cluster server, wherein the second metadata file comprises a second ordered list of block identifiers for data blocks, wherein each block identifier is used to access a data block stored on one of a second plurality of block servers, wherein each block identifier is a hash based on content of its corresponding data block, and wherein the second ordered list of block identifiers corresponds to a second plurality of volumes of client metadata stored on the second cluster server;

comparing, by the second one or more processors, the first metadata file to the second metadata file to determine a difference list, wherein the difference list comprises block identifiers from the first ordered list that differ from block identifiers of the second ordered list; and sending, by the second one or more processors, to the first cluster server, a request for data blocks, wherein the request comprises the block identifiers from the difference list.

12. The method of claim 11, wherein the first metadata file comprises an first hash tree, wherein the second metadata file comprises a second hash tree, and the updating further comprises:

determining a second root node of the second hash tree is different than a first root node of the first hash tree;

adding child nodes of the second root node to a second data structure; and for each child node in the second data structure:
determining a corresponding node in the first hash tree;
determining if the child node is different than the corresponding node;
determining if the child node is a leaf node or a non-leaf node based on the determination that the child node is different than the corresponding node;
adding the child node to the second data structure based on the determination that the child node is a non-leaf node; and
adding the block identifier associated with the child node to the difference list based on the determination that the child node is a leaf node.

13. The method of claim 11, wherein the difference list further indicates that a data block on the first cluster server corresponding to the block identifiers on the difference list has changed and a corresponding data block on the second cluster server should be changed.

14. The method of claim 11, wherein the first ordered list of block identifiers and the second ordered list of block identifiers each have N possible block identifier storage positions, and wherein comparing the first metadata file to the second metadata file to determine the difference list comprises:

comparing the N possible block identifier storage positions in the first ordered list to the N number of possible block identifier storage positions in the second ordered list, such that:
a first possible block identifier storage position in the first ordered list is compared to a first possible block identifier storage position in the second ordered list,
a second possible block identifier storage position in the first ordered list is compared to a second possible block identifier storage position in the second ordered list, and
subsequent possible block identifier storage positions in the first and second ordered lists are compared until an Nth possible block identifier storage position in the first ordered list is compared to an Nth possible block identifier storage position in the second ordered list.

15. The method of claim 14, wherein when a possible block identifier storage position of the first ordered list is different from a possible block identifier storage position of the second ordered list and a first block identifier is stored in the possible block identifier storage position of the first ordered list, the updating further comprises adding the first block identifier to the difference list.

16. The method of claim 14, wherein when a possible block identifier storage position of the first ordered list is different from a possible block identifier storage position of the second ordered list and there is no block identifier stored in the possible block identifier storage position of the first ordered list, the updating further comprises deleting a block identifier stored in the second cluster server at the possible block identifier storage position of the second ordered list.

17. The method of claim 14, wherein N is an integer above zero.

18. The method of claim 11, wherein the difference list comprises a list of leaf nodes that differ between the first plurality of block servers and the second plurality of block servers, and wherein each leaf node comprises 256 block identifiers.

19. A non-transitory computer-readable medium having instructions stored thereon, that when executed by a computing device cause the computing device to perform operations comprising:
   updating a second cluster server, having a second memory and a second one or more processors, that backs up a first cluster server having a first memory and a first one or more processors, wherein the updating comprises:
      retrieving, by the second one or more processors, a first metadata file from a first cluster server, wherein the first cluster server is different than the second cluster server, wherein the first metadata file comprises a first ordered list of block identifiers for data blocks, wherein each block identifier is used to access a data block stored on one of a first plurality of block servers, wherein each block identifier is a hash based on content of its corresponding data block, and wherein the first ordered list of block identifiers corresponds to a first plurality of volumes of client metadata stored on the first cluster server;
      retrieving, by the second one or more processors, a second metadata file from a second cluster server, wherein the second metadata file comprises a second ordered list of block identifiers for data blocks, wherein each block identifier is used to access a data block stored on one of a second plurality of block servers, wherein each block identifier is a hash based on content of its corresponding data block, and wherein the second ordered list of block identifiers corresponds to a second plurality of volumes of client metadata stored on the second cluster server;
      comparing, by the second one or more processors, the first metadata file to the second metadata file to determine a difference list, wherein the difference list comprises block identifiers from the first ordered list that differ from block identifiers of the second ordered list; and
      sending, by the second one or more processors, to the first cluster server, a request for data blocks, wherein the request comprises the block identifiers from the difference list.

20. The non-transitory computer readable medium of claim 19, wherein the block identifiers stored on the first plurality of volumes and the second plurality of volumes represent blocks that comprise compressed data.

21. The non-transitory computer readable medium of claim 19, wherein the updating occurs in response to a request received via an application programming interface (API) of the second cluster server.

22. The non-transitory computer readable medium of claim 19, wherein data is retrieved by the second one or more processors of the second cluster server according a protocol of at least one of small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), and a custom protocol.

\* \* \* \* \*